UNITED STATES PATENT OFFICE.

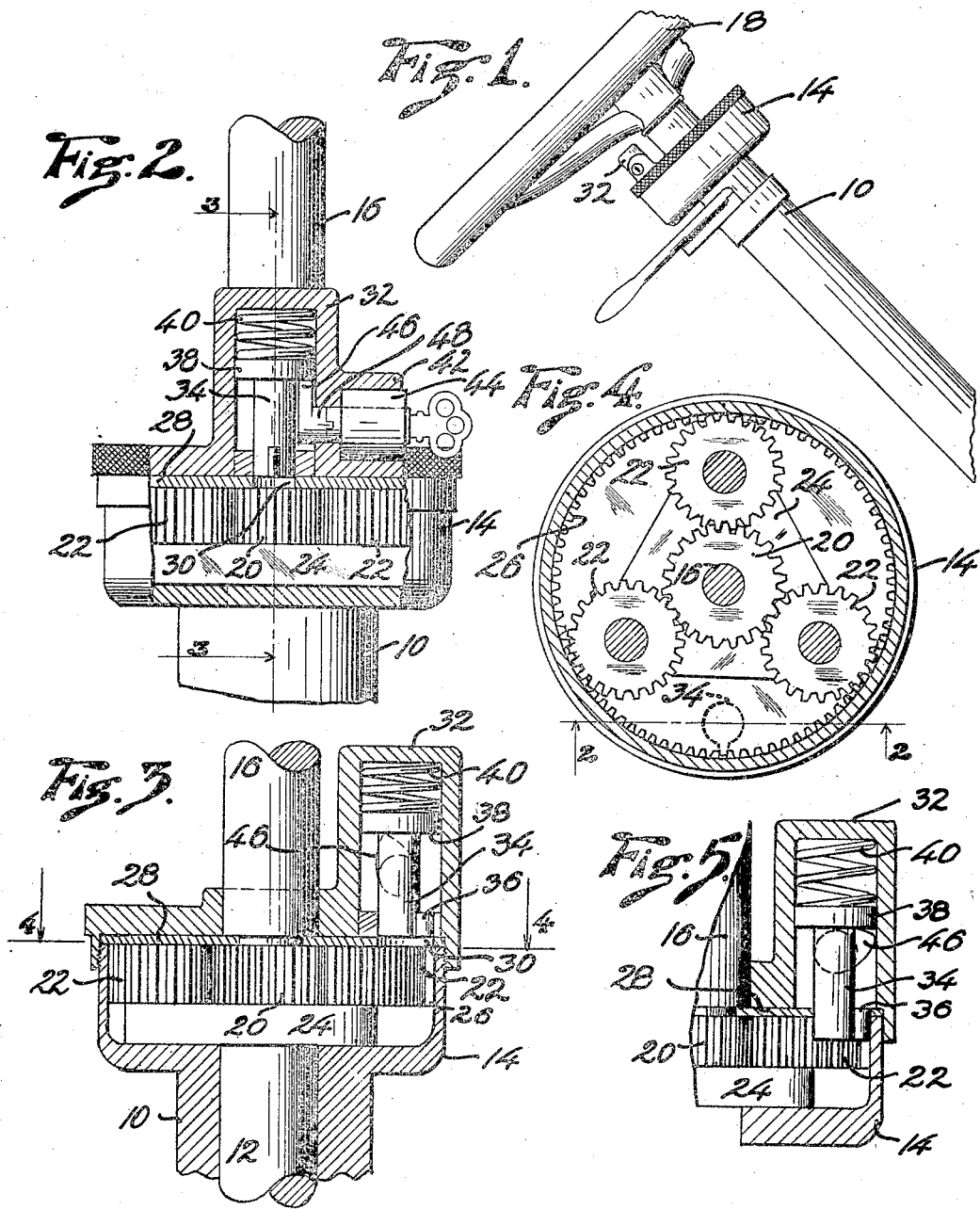

WILLIAM J. LANE, OF DENVER, COLORADO.

STEERING-WHEEL LOCK.

1,378,244.    Specification of Letters Patent.    Patented May 17, 1921.

Application filed October 31, 1919. Serial No. 334,652.

*To all whom it may concern:*

Be it known that I, WILLIAM J. LANE, a citizen of the United States, residing at the city and county of Denver and State of Colorado, have invented certain new and useful Improvements in Steering-Wheel Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a locking device for the steering wheel of automobiles, whereby steering of a machine may be prevented in order to prevent theft.

Briefly, the invention comprises a housing mounted upon the steering wheel gear casing, this housing containing a spring-pressed vertically disposed reciprocable key controlled by a locking device adapted to retain the key either in raised or lowered position. When in lowered position the key engages in the internal gear in the gear casing and prevents rotation of the steering mechanism.

In the drawing:

Figure 1 shows the application of the device.

Fig. 2 is in general a vertical section taken on the line 2—2 of Fig. 4, showing the internal structure.

Fig. 3 is a vertical section on the line 3—3 in Fig. 2.

Fig. 4 is a cross section on line 4—4 of Fig. 3.

Fig. 5 is a detail vertical section similar to that of Fig. 3, showing the key in locking position.

The drawings show the usual casing 10 for steering post 12, which carries at its upper end a gear casing 14, into which extends the post 16 of the steering wheel 18. The post 16 carries on its lower end the usual pinion 20, which meshes with the gears 22 mounted on the spider 24, the gears 22 in turn engaging the internal gear 26 on the casing 14.

The wheel post 16 has also fixed thereto a plate 28, positioned above the pinion 20 and gears 22. This plate 28 rotates with the post 16 and is provided with a keyhole 30. The cover of the gear casing 14 is provided with a housing 32, containing a vertically disposed key 34, having a projection 36 adapted to engage the internal gear 26 when in lowered position, as in Fig. 5.

The key 34 is provided with an upper annular flange 38, against which there bears a spring 40 in the top of the housing 32. A small housing 42 is offset in the housing 32 and contains some form of lock such as a tumbler lock 44. This lock operates a cam 46 through the medium of a spindle 48, the cam operating upon the annular flange 38 of the key 34.

In order to unlock the steering wheel, the lock 44 is turned to bring the cam 46 to a point a little past dead center, as indicated in Fig. 3. The key 34 is thus withdrawn from engagement with the internal gear 36 and effectually held in inoperative position. The wheel post 16 and the plate 28 are then free to revolve. In order to lock the steering mechanism, the cam 46 is turned to the position shown in Fig. 5 to allow the key 34 to be forced downwardly. The steering wheel is then rotated until the keyhole 30 in the plate 28 is directly beneath the said key. The spring 40 then forces the key into engagement with the internal gear 26.

Not only does the key 34 prevent rotation of the plate 28, and hence, of the post 16 and wheel 18, but it is also interposed in the path of the gears 22 and would prevent rotation of these. The plate 28 may be originally fixed on the post 16 in order that the front wheels of the automobile may be set at any desired angle when the steering wheel is locked. Also when the key is in locked position on the gear, removal of the gear casing cover will be prevented.

I claim:

1. In combination, a steering wheel post, a gear casing having an internal gear thereon, a pinion on said post, gears meshing with said pinion and with said internal gear, a reciprocable key mounted in said casing and adapted to engage the internal gear to lock said post, means to move said key into and out of engagement with said internal gear, and a plate secured to said post and rotatable therewith, said plate having a keyhole for passage of said key into engagement with the internal gear.

2. In combination, a steering wheel post, a gear casing having an internal gear thereon, a pinion on said post, gears meshing with said pinion and with said internal gear, a reciprocable key mounted in said casing and adapted to engage the internal gear to lock said post, means to move said key into and out of engagement with said internal gear, said means comprising a flange on said key, a lock-controlled cam to engage the flange to elevate the key or to allow it to fall, and a plate secured to said post and rotatable therewith, said plate having a keyhole for passage of said key into engagement with the internal gear.

3. In combination, a steering wheel post, a gear casing having an internal gear thereon, a pinion on said post, gears meshing with said pinion and with said internal gear, a reciprocable key mounted in said casing and adapted to engage the internal gear to lock said post, lock-controlled means engaging said key to withdraw the same, spring means engaging said key to urge it into locking position, and a plate secured to said post and rotatable therewith, said plate having a keyhole for the passage of said key under influence of said spring into engagement with said internal gear when the keyhole is in alinement with the key.

4. In combination, a steering wheel post, a gear casing having an internal gear thereon, a pinion on said post, gears meshing with said pinion and with said internal gear, a reciprocable key mounted in said casing and adapted to engage the internal gear to lock said post, means to move said key into and out of engagement with said internal gear, said means comprising a flange on said key, a lock-controlled cam to engage the flange to elevate the key, and a spring pressing on the key to urge it downward, and a plate secured to said post and rotatable therewith, said plate having a keyhole for passage of said key into engagement with the internal gear.

5. In combination, a steering wheel post, a gear casing having an internal gear thereon, a pinion on said post, gears meshing with said pinion and with said internal gear, a reciprocable key mounted in said casing and adapted to engage the internal gear to lock said post, means to move said key into and out of engagement with said internal gear, said means comprising a flange on said key, a rotary lock-controlled cam to engage the flange to withdraw the key, and a spring pressing on the key to urge it into engagement with the internal gear, the rotary cam being movable to a point slightly beyond dead center to maintain the key in withdrawn position.

6. In combination, a steering post casing, a second casing mounted thereon, a steering wheel, a steering wheel post thereon and extending into said second casing, a plate fixed to said post and positioned within said second casing, said plate having a keyhole, a lock-controlled key mounted in said second casing and adapted to project through said keyhole to lock said plate and steering wheel and spring means engaging said key to urge it into locking position.

7. In combination, a steering post casing, a gear casing mounted thereon having an internal gear, a steering wheel, a post on said wheel extending into said gear casing, a plate fixed to said post and positioned within the second casing, said plate having a keyhole, a lock-controlled key mounted in the second casing and adapted to project through said keyhole and into engagement with said internal gear to lock the plate, post and steering wheel and spring means engaging said key to urge it into locking position.

8. In combination, a steering post casing, a gear casing mounted thereon having an internal gear, a steering wheel, a longitudinally fixed post on said wheel extending into said gear casing, means on said post and within the gear casing coöperating with the internal gear for steering purposes, a key mounted in said gear casing and adapted to project into engagement with said internal gear to lock the post and wheel against rotation, spring means engaging said key to urge the key into locking position, and a lock controlled cam to withdraw it to inoperative position.

9. In combination, a steering post casing, a gear casing mounted thereon having an internal gear, a steering wheel, a post on said wheel extending into the gear casing, a plate fixed to said post and positioned within the gear casing, said plate having a keyhole, and a lock-controlled key mounted in the second casing adapted to be released so as to bear upon said plate and adapted to project through said keyhole and engage with said internal gear when said key hole alines with said key.

10. In combination, a steering post casing, a steering wheel, a steering wheel post connected therewith and extending into said casing, a plate and a pinion fixed to said post and positioned within said casing, spaced gears in the casing meshing with the pinion, said plate having a keyhole therein and a lock-controlled key adapted to be released by said lock to engage with said plate and adapted to project through said keyhole when the latter is in alinement with the key into position between the gears to lock the same.

In testimony whereof I affix my signature.

WILLIAM J. LANE.